United States Patent [19]

Bourg et al.

[11] 4,043,608

[45] Aug. 23, 1977

[54] BRAKE FORCE CONTROL DEVICE FOR BACK-CONTROL

[75] Inventors: Guillaume Bourg, Karlsruhe; Hubertus Christ, Stuttgart; Taddäus Hausmann, Worth; Louis Sales, Blankenloch, all of Germany

[73] Assignee: Daimler-Benz Aktiengesellschaft, Germany

[21] Appl. No.: 664,031

[22] Filed: Mar. 4, 1976

Related U.S. Application Data

[63] Continuation of Ser. No. 280,189, Aug. 14, 1972, abandoned.

[30] Foreign Application Priority Data

Aug. 13, 1971 Germany .............................. 2140658

[51] Int. Cl.$^2$ .............................................. B60T 8/08
[52] U.S. Cl. ......................................... 303/104; 303/20
[58] Field of Search ................... 180/82 R; 235/150.2; 303/20, 100, 104

[56] References Cited

U.S. PATENT DOCUMENTS

| | | | |
|---|---|---|---|
| 3,508,795 | 4/1970 | Scharlack | 303/104 |
| 3,663,069 | 5/1972 | Perry et al. | 303/104 |

*Primary Examiner*—Stephen G. Kunin
*Attorney, Agent, or Firm*—Craig & Antonelli

[57] ABSTRACT

A brake force control system for vehicles, especially an electronic brake force control system for motor vehicles and rail vehicles, with a back-control (1) reduction control (1) of the brake pressure of the pressure control medium causing a reduction of the brake pressure when a maximum wheel circumferential force acting at the wheel is exceeded; the back-control being disengaged when the wheel circumferential force again increases after re-exceeding the maximum value whereby the engagement and disengagement of the back-control of the brake pressure is controlled by signals which are formed, taking into consideration the hysteresis effect of the control operation, by the signs of the derivatives with respect to time of the circumferential force and of the brake pressure.

21 Claims, 10 Drawing Figures

| a | $\frac{dp}{dt}$ | $\frac{dU}{dt}$ | Rg |
|---|---|---|---|
| (O)F-A | + | + | |
| A-B | + | − | IN |
| B-C | − | − | |
| C-D | − | + | |
| D-E | − | − | OUT |
| E-F | + | − | |
| F-A | + | + | |

| a | $\frac{dp}{dt}$ | $\frac{dU}{dt}$ | $\frac{d^2U}{dt^2}$ | Rg |
|---|---|---|---|---|
| (O)F-A | + | + | − | |
| A-B | + | − | − | IN |
| B-C | − | − | + | |
| C-D | − | + | +/− | |
| D-E | − | − | − | OUT |
| E-F | + | − | + | |
| F-A | + | + | +/− | |

BRAKE FORCE CONTROL DEVICE FOR BACK-CONTROL

This is a continuation of application Ser. No. 280,189, filed Aug. 14, 1972 now abandoned.

The present invention relates to a brake force control device for vehicles, especially to an electronic brake-force control device, and in particular for motor vehicles and rail vehicles, with a back-control (reduction control) of the brake pressure of the pressure-control medium upon exceeding a maximum wheel circumferential force acting at the wheel and with a disengagement of the back-control when the wheel circumferential force again decreases after the maximum is again exceeded or passed through. Back-control is a brake pressure control which is responsive to at least a first sensed dynamic condition for engaging to cause a reduction of the brake pressure and which is responsive to at least a second sensed dynamic condition for disengaging to cause reapplication of brake pressure so as to prevent skidding of the vehicle as a result of the braking operation. Control devices known heretofore of the brake force which have for their purpose to utilize to a maximum extent the available brake force, utilize as a control magnitude directly or indirectly the angular deceleration and acceleration of the wheel.

The magnitude of the angular deceleration which indicates when exceeding the maximum, depends on different parameters such as road and tire characteristics, wheel load, velocity of the vehicle, slippage, brake pressure, etc. The once-adjusted response value of the angular deceleration therefore assures an optimum braking operation generally only for a predetermined parameter combination. At all other parameter combinations, however, the control device of the prior art brings about that it either responds already prior to reaching the maximum brake force, i.e., this maximum brake force is therefore not reached, or it responds only after exceeding the brake force maximum so that under certain circumstances it cannot even prevent a blocking of the wheels. Last but not least, for that reason such control devices, if they are to operate and function properly, necessarily require an additional rotational speed comparator of the individual wheels.

It has also been already proposed in order to obtain a desired or intended value of the control magnitude independently of any arbitrary parasitic or disturbance parameter combinations, to utilize as a control magnitude the magnitude of the circumferential force which can be transmitted between tires and road surface. This is possible in all those cases in which the circumferential force possesses a well-defined maximum within the brake slippage range. The circumferential force of the wheel and its maximum value thereby also depend from different parameters, for example, from the road surface- and tire-characteristics, the wheel load, the velocity of the vehicle, the brake slippage and the like. Since, however, the circumferential force is caused by the brake pressure, one can consider the circumferential force as a function of the brake pressure. The possibility then exists to control the brake pressure as a function of circumferential force which, in its turn, depends on the brake pressure, whereby the changes of all parameters are taken into consideration. Consequently, it is proposed according to the present invention to permit the brake to remain effective for such length of time as the circumferential force still increases with an increasing brake pressure, i.e., therefore as long as the derivatives with respect to time of brake pressure and circumferential force are positive whereas in contradistinction thereto, a reduction or back-control of the brake pressure is to be effected if with an increasing brake pressure the circumferential force decreases, i.e., if with a positive derivative with respect to time of the brake pressure, the derivative with respect to time of the circumferential force is negative.

Accordingly, it is an object of the present invention to provide a brake force control system of the aforementioned type which avoids by simple means the shortcomings and drawbacks encountered heretofore.

Another object of the present invention resides in a brake force control device which is substantially independent of various parameters and their combinations that have to be taken into consideration in the brake force control operation.

A further object of the present invention resides in a brake force control system of the type described above which is extraordinarily reliable in achieving a maximum brake force, yet is simple in construction and avoids the need of rotational speed comparison of the speeds of the individual wheels among each other.

These and further objects, features, and advantages of the present invention will become more apparent from the following description when taken in connection with the accompanying drawings which shows, for purposes of illustration only, one embodiment in accordance with the present invention, and wherein.

Figure 3A:
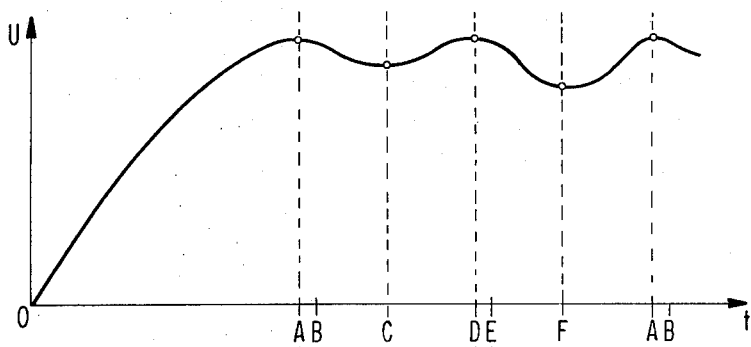
Figure 3B:
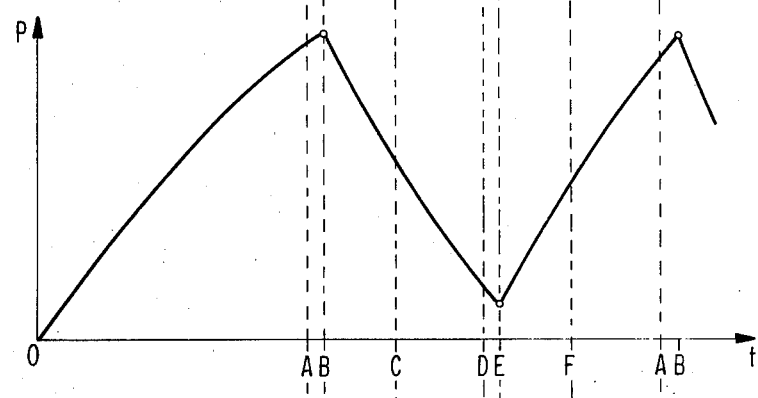
Figure 3C:
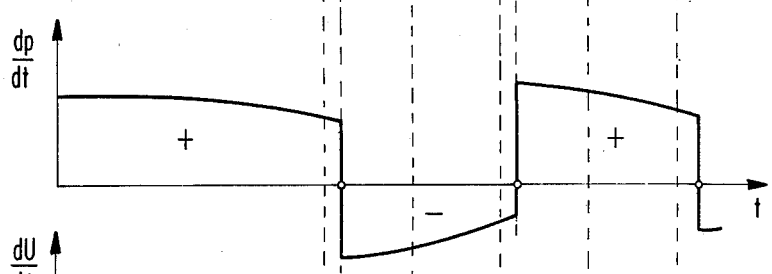
Figure 3D:
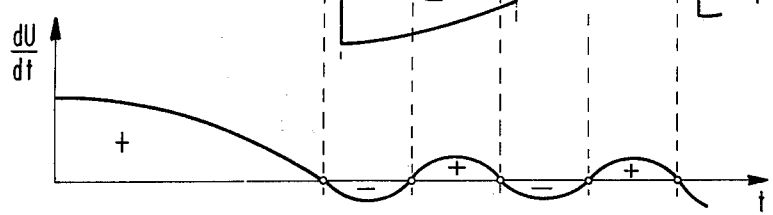
Figures 4, 5, 6:
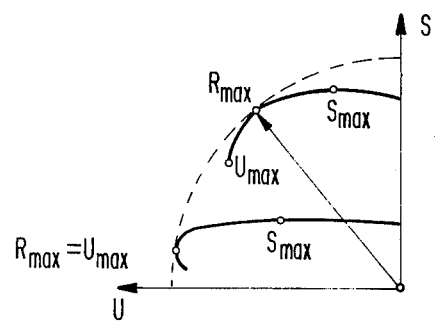
Figure 7:
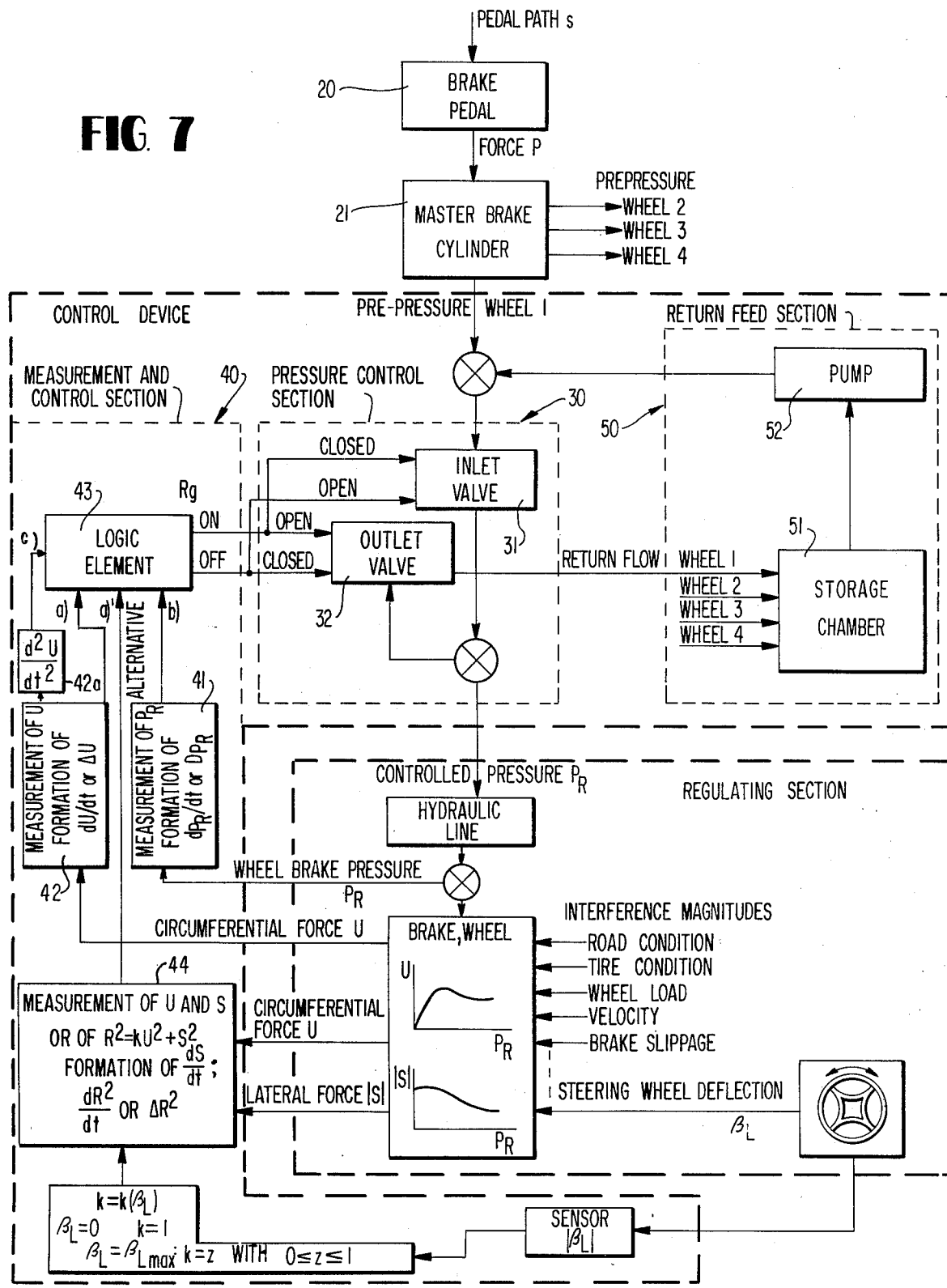

FIGS. 3$a$, 3$b$, 3$c$ and 3$d$ are diagrams of the curves of the circumferential force U, of the brake pressure $p$ and of their derivatives plotted as a function of time for a complete control cycle;

FIG. 4 is a table indicating the sign combinations of the derivatives for the individual sections of the curves according to FIGS. 3$a$–3$d$;

FIG. 5 is a table, similar to FIG. 4 which includes a further column for the second derivative of the circumferential force with respect to time;

FIG. 6 is a diagram indicating two possible curves of a number of curves for the control of $R_{max}$; and FIG. 7 is a block diagram of a control device in accordance with the present invention.

Figure 1:
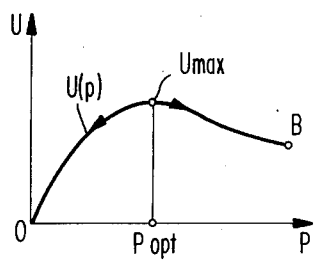
FIG. 1 is a diagram illustrating the ideal control curve for the wheel circumferential force U as a function of brake pressure $p$.

Referring now to the drawings wherein like reference numerals are used throughout the various views to designate like parts, and more particularly to FIG. 1, this figure represents the ideal control curve for the wheel circumferential force U as a function of brake pressure $p$ which is illustrated in this figure. As soon as the maximum circumferential force $U_{max}$ is exceeded at a most favorable pressure $p_{opt}$, the control of the brake pressure in the sense of a back-control causing a reduction of the brake pressure commences. The advantage of such a control resides in that neither the magnitude of $U_{max}$ nor the magnitude of $p_{opt}$ need to be known because as a control magnitude, only the criteria for the occurrence of a maximum, namely, the change in sign of the derivative is used.

Nonetheless, such a control is not adequate because it presupposes that the control takes place in an inertialess manner along the curve U(p) according to FIG. 1, i.e., without regard to time constants of the components of the control system. However, in practice an inertialess or time constantless control does not take place. By reason of the time constants of the control system components such as the resistances, finite shifting times of the valves or the like, the curve of the reduction or back-control does not coincide with the curve of the upward or increased control, but rather, a type of hysteresis appearance occurs which has to be taken into consideration during the control. Without recognition of these relationships or possibly based on practical experience, it had been proposed heretofore to utilize, in addition to the circumferential force, the angular deceleration (or acceleration) of the individual wheel as a control magnitude.

The present invention is predicated on the accurate analysis of the hysteresis effect to be observed as well as on the conclusions to be further derived therefrom that the response of the brake pressure control is not dependent along on the instantaneous signs of the derivatives with respect to time of the circumferential force and of the brake pressure or of the combination of the two, but instead requires a differentiated consideration. The present invention is further predicated on the recognition that a brake force control is possible exclusively with the use of the sign of the derivatives with respect to time of brake force and circumferential force, without the use of additional auxiliary magnitudes such as wheel velocity or wheel deceleration, and essentially consists in that the engagement and disengagement of the the reduction or back-control of the brake pressure $p$ is controlled by signals which are formed, taking into consideration the hysteresis effect of the control operation, by the signs of the differentials with respect to time $dU/dt$ and $dp/dt$ of the circumferential force U and of the brake pressure $p$ so as to compensate for the hysteresis effect.

In particular, the back-control of the brake pressure with an increasing brake pressure and a decreasing wheel circumferential force (i.e., with $dp/dt$ positive and $dU/dt$ negative) is initiated only if prior thereto the wheel circumferential force and the brake pressure increased (i.e., with $dU/dt$ positive and $dp/dt$ positive), and is disengaged with a decreasing brake pressure and with a decreasing wheel circumferential force (i.e., with $dp/dt$ negative and with $dU/dt$ negative) only if prior thereto the wheel circumferential force increased with a decreasing brake pressure (i.e., with $dU/dt$ positive and with $dp/dt$ negative). Equivocal sign combinations which, as such, are susceptible of different interpretations, are thereby processed into unequivocal signals for the brake pressure decrease or increase by the simultaneously utilized informations displaced with respect to time whereby the hysteresis effect on the control operation is avoided.

The control can also take place unequivocally, notwithstanding equivocal sign combinations of the derivatives with respect to time of the brake pressure and of the circumferential force without the assist of the time-displaced information of these magnitudes in that in lieu of the time-displaced informations, such information as is concerned with the sign of the second differential quotient (second derivative) of the circumferential force is utilized.

Figure 2:
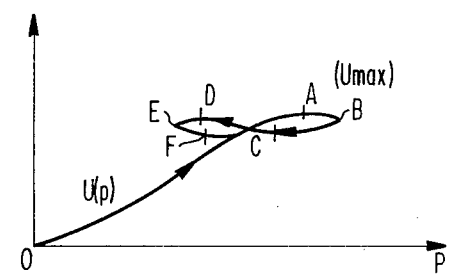
FIG. 2 is a diagram illustrating the ideal curve of the relationship of circumferential force U as a function of brake pressure $p$ together with the loop-shaped curve corresponding to the actual control curve with hysteresis effect.

These relationships will be described more fully hereinafter with respect to FIGS. 2 and 3. In FIG. 2, the dependency of the circumferential force U on the brake pressure $p$ is illustrated, with $U(p)$ as the ideal control curve, along which takes place the control in the ideal case without hysteresis effect whereas the loop-shaped curve ABCDEFA represents approximately the actual control curve with hysteresis effect.

In FIGS. 3a and 3b the qualitative progress of the circumferential force U and of the brake pressure $p$, respectively, is plotted as a function of time for one control cycle. FIG. 3a thereby represents the qualitative progress of the circumferential force U plotted against time while FIG. 3b represents the qualitative progress of the brake pressure $p$ plotted against time. FIG. 3c additionally illustrates the progress of the first derivative of the brake pressure $p$ with respect to time ($dp/dt$) plotted against time and FIG. 3d the first derivative of the circumferential force U with respect to time ($dU/dt$) plotted against time. The same reference characters correspond to one another in FIG. 2 and FIGS. 3a–3d.

If the brake pressure $p$ (FIG. 3b) increases beginning at 0, then also the circumferential force U (FIG. 3a) increases and reaches at point A the maximum. Upon exceeding this maximum and during the decrease in the direction toward the locking condition, i.e., during the period of time A–B the change of the sign of $dU/dt$ (FIG. 3d) is determined by a measuring apparatus of conventional construction and therefore not described in detail herein, and the signal for the pressure decrease is produced thereby. The pressure decrease begins at point B (FIG. 3b). The period of time A–B is thus an unavoidable time loss and should be kept as small as possible.

During the period of time B–C, the pressure $p$ decreases (FIG. 3b), however, by reason of the inertia of the system, the circumferential force U further decreases in the direction toward the locking condition to reach its lowest value at point C (FIG. 3a). The time B–C is thus again a time loss unavoidable by reason of the inertia of the system and is dependent on the preceding dynamic operations, and more particularly on the steepness of the pressure increase prior to reaching the maximum circumferential force.

During the period of time C–D, the brake pressure $p$ (FIG. 3b) further decreases, and the circumferential force U (FIG. 3a) again commences to increase (coming from the direction of locking) in the direction toward its maximum and reaches the same at the point D (FIG. 3a).

Upon exceeding this maximum at point D, i.e., during the period of time D–E the change in sign of $dU/dt$ (FIG. 3d) is determined by a conventional measuring apparatus and the signal for the re-increase of the brake pressure is produced thereby. The time interval D–E thus corresponds in its cause to the time interval A–B.

At the instant E, the brake pressure $p$ (FIG. 3b) thus commences to increase again, whereby, however, the circumferential force U (FIG. 3a) continues to decrease during the period of time E–F by reason of the inertia of the system to catch itself only at the instant F in order to rise thereafter again to the point A. The time interval E–F thus corresponds in its cause to the time interval B–C. Thereafter, during the section (time interval) F–A, the circumferential force U again increases to its maximum with an increasing brake pressure $p$.

One control cycle has thus been passed through which can repeat itself as often as necessary, for example, up to the stoppage of the vehicle.

The sign combinations of the derivatives for the individual sections (time intervals) A–B, B–C, C–D, D–E, E–F, F–A are illustrated in the table according to FIG. 4. The individual sections or time intervals are entered in the first column $a$, the signs of the control pressure changes in the second column $dp/dt$, the signs of the circumferential force changes with respect to time in the third column "$dU/dt$" and the control condition of the control device in the last column "$Rg$".

As can be seen from the table of FIG. 4, the sign combination $+-$ occurs twice, and more particularly in the sections A–B and E–F, and the sign combination $--$ twice, and more particularly in the sections B–C and D–E. Presupposing a response of the control device exclusively for back control (reduction control), the control device, however, is to be engaged only in the section A–B and is to be disengaged or turned off only in the section D–E. In order that the control device responds to the sign combination of the differential quotients only within the correct section, also the sign combination of the preceding section, i.e., the "previous history" of the sign combination has to be taken into consideration. The control device therefore should engage in the presence of the combination $+-$ only if prior thereto the combination $++$ was effective, and is to disengage in the presence of the combination $--$ only if prior thereto the combination $-+$ has been effective.

In practice, this can take place electronically in a simple and known manner by the use of conventional electronic circuits, particularly by the use of conventional logic elements.

In lieu of a dependency on the "preceding history" of the control, a control for the engagement and disengagement of the control device is also possible in that in addition to the first derivatives of brake pressure $p$ and of the circumferential force U, also the second derivative of the circumferential force U is taken into consideration.

The table in FIG. 5 therefore contains in addition to those columns according to FIG. 4, a further column $d^2U/dt^2$, in which the signs of the second derivative of the circumferential force U are entered for the individual sections. As can be readily seen from the horizontal rows surrounded in heavy lines, the engagement can take place in that case if $dp/dt$ is positive, $dU/dt$ is negative and $d^2U/dt^2$ is also negative whereas the disengagement takes place when all three values are negative.

The brake force control device described hereinabove effects a control for maximum circumferential force in the longitudinal direction of the vehicle, i.e., it operates in such a manner that the shortest brake path is achieved when driving straight.

The progress of a controlled braking operation of a vehicle with hydraulic brake pressure production will now be explained by reference to the block diagram of the closed control circuit illustrated in FIG. 7.

By actuating the brake pedal 20, a pre-pressure is produced in the master brake cylinder 21 of conventional construction which continues by way of the normally open inlet valve 31 of the pressure control section generally designated by reference numeral 30 and the hydraulic line up to the brake of the wheel. This wheel brake pressure produces a braking moment at the individual wheel which produces a predetermined circumferential force U and lateral force S dependent on various interference or disturbance magnitudes, such as road condition, tire condition, wheel load, velocity, brake slippage, etc. By increasing or decreasing the brake pressure, these forces are varied in a characteristic manner. The wheel brake pressure $p_R$ and the circumferential force U are measured by sensing devices 41 and 42 of conventional construction provided in the measurement and control section generally designated by reference numeral 40 and the sign of their derivatives with respect to time $dp_R/dt$ and $dU/dt$ are formed or, in the alternative, the signs of their changes $\Delta p_R$ and $\Delta U$ are measured directly. Additionally, device 42a of conventional construction provides a signal $d^2U/dt^2$ or $2U$ and supplies such signal as input (c) to logic element 43. These signs $a$ and $b$ in FIG. 7 are further processed in the logic elements 43 of conventional construction in accordance with the table of FIG. 4 or as signs $a$, $b$ and $c$ in accordance with Table 5 FIG. 5. Since the elements 41, 42 and 43 including the logic circuit elements are of conventional construction and involve commercially available circuits, a detailed description thereof is dispensed with herein.

If one utilizes for the back-control of the brake pressure separately controlled inlet and outlet valves 31 and 32, respectively, of the wheel brake cylinders, then the "ON" signal brings about the closing of the inlet valve 31 and the opening of the outlet valve 32 while the "OFF" signal brings about the closing of the outlet valve 32 and the opening of the inlet valve 31.

In the control position "ON", i.e., with closed inlet valve 31 and opened outlet valve 32, the required brake pressure decrease is effected in that the pressure control medium flows into a storage chamber or space 51 of the return flow section generally designated by reference numeral 50, from where it is supplied again to the master brake cylinder by means of a pump 52.

The same considerations as for the circumferential force are also valid for a control in which one controls for maximum lateral guidance force. In this case, the force transmitted from the road surface to the tire or wheel and acting in the transverse direction of the wheel has to be measured. The sign of the changes with respect to time of this force is provided in a known manner by device 44 which sign signal together with the sign of the brake pressure change then produces a signal for the engagement of the control device. This control corresponds to the alternative input $a'$ to the logic element 43 of FIG. 7 with $K=0$.

Similarly, the control system according to the present invention is also applicable to a combined control in which one controls for the maximum of the resultant of circumferential and lateral guidance force. If R is the resultant and S the lateral guidance force, R can be calculated from $R^2 = kU^2 + S^2$ by device 44 in a known manner. Instead of controlling for $U_{max}$ or $S_{max}$, one then controls for $R_{max}$ or $R_{max}^2$.

In FIG. 6, two possible curves of a large number of curves which correspond to different angles of inclined running, are illustrated for the regulation for $R_{max}$. This control for $R_{max}$ corresponds to the alternative input $a'$ to the logic element 43 of FIG. 7 with $k = 1$.

The control for a maximum resultant has the advantage that it enables the most rapid energy change, i.e., the largest power. Additionally, it will always be necessary if the circumferential force possesses no well-defined maximum within the slippage range whereas such a maximum regularly exists for the resultant. As to the rest, the same is valid as regards the hysteresis effect for the lateral guidance force and the resultant as for the wheel circumferential force.

The selection of the control for wheel circumferential force and lateral guidance force can further be made dependent by conventional means from a predetermined value of the steering deflection and/or of the vehicle velocity, for example, in such a manner that the control for lateral guidance force is set into operation only when the steering deflection has exceeded a predetermined value. This control corresponds to the alternative input $a'$ to the logic element 43 of FIG. 7 with $k$ as a function of $\beta_L$ to be determined in a varying manner.

In lieu of the sign of the control magnitude $dR/dt$, also a threshold value can be determined which is dependent on the steering deflection and/or the vehicle velocity in such a manner that the $R_{max}$ control is displaced in the direction toward $U_{max}$ or $S_{max}$.

It is also possible to determine in dependence on the steering deflection and the velocity of the vehicle the centrifugal force to be expected at the vehicle and to cause the threshold value to adjust itself automatically with the aid of this information.

The actuating mechanisms for brake, engine and transmission are to be appropriately coupled with the corresponding control devices in such a manner that only a single actuating lever is necessary which during the movement in one direction brings about a faster drive and during the movement in the other direction a slower drive whereby a continuous transition should be provided if possible. The forces acting on the wheel may be obtained in a manner known in the art by utilizing known devices which, for example, provide at the axle of the wheel a measurement of the axle force of the wheel in the longitudinal direction of the wheel as the measuring magnitude for the circumferential force acting on the wheel and provided a measurement of the axle force of the wheel in the cross direction of the wheel as the measuring magnitude for the lateral guidance thereof.

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompasssed by the scope of the appended claims.

What we claim:

1. A brake force control device for vehicles with a back-control means reducing the brake pressure of the pressure control medium upon exceeding a maximum force acting at a wheel and with disengagement of the back-control means with a re-decreasing force after re-passing through the maximum value, characterized by further means for controlling the engagement and disengagement of said back-control means by signals including signal producing means for forming said signals, taking into consideration the hysteresis effect of the control operation, by the signs of the derivatives with respect to time of the force acting on the wheel and of the brake pressure, and characterized in that the back-control means causing a reduction of the brake pressure is initiated with an increasing brake pressure and a decreasing wheel force only if prior thereto both wheel force and brake pressure increased, and is turned-off with a decreasing brake pressure and a decreasing wheel force only if prior thereto the wheel force increased with a decreasing brake pressure.

2. A brake force control device according to claim 1, characterized in that the operation of the control device is controlled by said further means as a function of the wheel circumferential force.

3. A brake force control device according to claim 1, characterized in that the operation of the control device is controlled by said further means as a function of the lateral guidance force of the wheel.

4. A brake force control device according to claim 1, characterized in that the operation of the control device is controlled by said further means as a function of both wheel circumferential force and lateral guidance force.

5. A brake force control device according to claim 4, characterized in that the axle force of the wheel in the longitudinal direction is used as measuring magnitude for the circumferential force thereof and the axle force of the wheel in the cross direction of the wheel is utilized as measuring magnitude for the lateral guidance force thereof.

6. A brake force control device with brake pressure cylinder means according to claim 5, with the supply of the brake pressure utilizing inlet and outlet valve means for the brake pressure cylinder means, characterized in that for back control of the brake pressure causing a reduction thereof, the inlet valve means is closed and the outlet valve means is opened and for the termination of the back control, the outlet valve means is closed and the inlet valve means is opened.

7. A brake force control device according to claim 1, characterized in that the operation of the control device is controlled by said further means as a function of the resultant of wheel circumferential force and lateral guidance force.

8. A brake force control device for vehicles with a back-control means reducing the brake pressure of the pressure control medium upon exceeding a maximum circumferential wheel force acting at a wheel and with disengagement of the back-control means with a re-decreasing force after re-passing through the maximum circumferential wheel force, the brake force control device including means having time constants resulting in a hysteresis effect of the control operation, characterized by further means for controlling the engagement and disengagement of said back-control means by signals including signal producing means for forming said signals in consideration of the hysteresis effect of the control operation by the signs of the derivatives with respect to time of the circumferential wheel force acting on the wheel and of the brake pressure, and characterized in that the back-control means causing a reduction of the brake pressure is initiated with an increasing brake pressure and a decreasing circumferential wheel force only if prior thereto both circumferential wheel force and brake pressure increased, and is turned-off with a decreasing brake pressure and a decreasing circumferential wheel force only if prior thereto the circumferential wheel force increased with a decreasing brake pressure.

9. A brake force control device for vehicles with a back-control means reducing the brake pressure of the pressure control medium upon exceeding a maximum wheel force acting at a wheel and with disengagement of the back-control means with a re-decreasing force after re-passing through the maximum wheel force, the brake force control device including means having time constants resulting in a hysteresis effect of the control operation, characterized by further means for controlling the engagement and disengagement of said back-control means by signals including signal producing means for forming said signals, said signal producing means including means for compensating for the hysteresis effect of the control operation in accordance with the signs of the derivatives with respect to time of the wheel force acting on the wheel and of the brake pressure so as to avoid improper control in response to the hysteresis effect.

10. A brake force control device according to claim 9, characterized in that the further means includes electronic circuit means for determining the signs of the first derivatives.

11. A brake force control device according to claim 9, wherein U is the circumferential force acting on the wheel.

12. A brake force control device according to claim 9, characterized in that the force acting on the wheel is at least one of circumferential force and transverse lateral guidance force.

13. A brake force control device according to claim 12, characterized in that the back control means is engaged when the first derivative of the brake pressure with respect to time is positive and the first and second derivatives of said force with respect to time are negative, and is disengaged when said two first derivatives and said second derivative are negative.

14. A brake force control device according to claim 13, characterized in that the operation of the control device is controlled by said further means as a function of both wheel circumferential force and lateral guidance force.

15. A brake force control device according to claim 13, characterized in that the operation of the control device is controlled by said further means as a function of the resultant of wheel circumferential force and lateral guidance force.

16. A brake force control device according to claim 15, characterized in that the axle force of the wheel in the lingitudinal direction is used as measuring magnitude for the circumferential force thereof and the axle force of the wheel in the cross direction of the wheel is utilized as measuring magnitude for the lateral guidance force thereof.

17. A brake force control device according to claim 12, characterized in that the back control means causing a reduction of the brake pressure is initiated with an increasing brake pressure and a decreasing wheel force only if prior thereto both wheel force and brake pressure increased, and is turned-off with a decreasing brake pressure and a decreasing wheel force only if prior thereto the wheel force increased with a decreasing brake pressure.

18. A brake force control device according to claim 17, characterized in that the operation of the control device is controlled by said further means as a function of both wheel circumferential force and lateral guidance force.

19. A brake force control device according to claim 17, characterized in that the operation of the control device is controlled by said further means as a function of the resultant of wheel circumferential force and lateral guidance force.

20. A brake force control device according to claim 19, characterized in that the axle force of the wheel in the longitudinal direction is used as measuring magnitude for the circumferential force thereof and the axle force of the wheel in the cross direction of the wheel is utilized as measuring magnitude for the lateral guidance force thereof.

21. A brake force control device according to claim 9, characterized in that the back-control means is engaged when $dp/dt$ is positive and simultaneously $dU/dt$ and $d^2U/dt^2$ are negative, and is disengaged if $dp/dt$ as also $dU/dt$ and $d^2U/dt^2$ are negative, $p$ being the brake pressure and U being the circumferential force acting on the wheel.

* * * * *